OR  3,915,547

United States Patent
Scidmore et al.

[11] 3,915,547
[45] Oct. 28, 1975

[54] OBJECTIVE LENS SYSTEM

[75] Inventors: Wright H. Scidmore, Langhorne, Pa.; Robert P. O'Shaughnessy, Voorhees, N.J.

[73] Assignee: The United States of America as represented by the Secretary of the Army, Washington, D.C.

[22] Filed: Oct. 29, 1974

[21] Appl. No.: 518,429

[52] U.S. Cl. .................. 350/2; 350/45; 350/50; 350/216; 350/223
[51] Int. Cl.² ................ G02B 9/60; G02B 11/30
[58] Field of Search ............ 350/2, 216, 223, 8, 45, 350/50, 219, 220

[56] References Cited
UNITED STATES PATENTS
2,600,805   6/1952   Reiss ................................. 350/216

Primary Examiner—Siegfried H. Grimm
Attorney, Agent, or Firm—Samuel Kane; Nathan Edelberg; Robert P. Gibson

[57] ABSTRACT

A refractive lens system in which all the operative lens surfaces are spherical, and which is exceedingly well corrected for the visible and near infrared spectral ranges over a wide field of view so that it matches both the spectral response required and the flat photocathode of an image intensifier tube.

7 Claims, 2 Drawing Figures

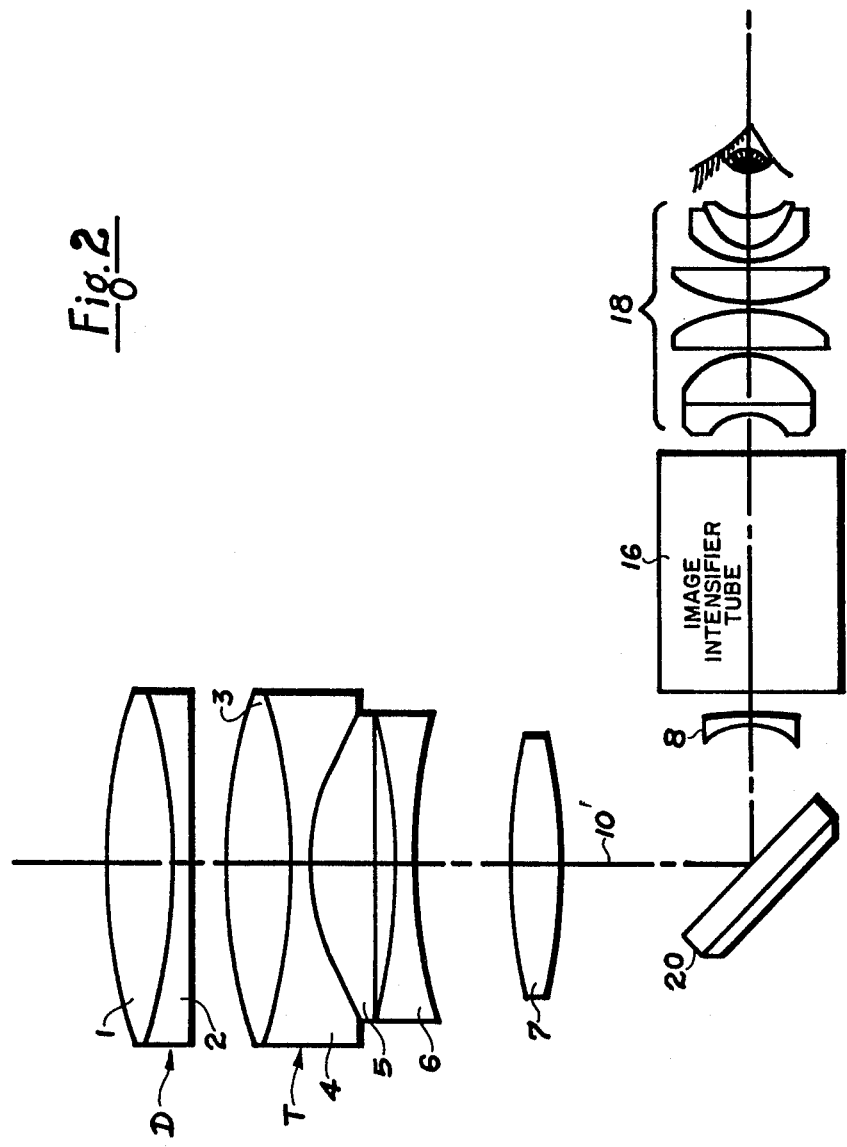

OBJECTIVE LENS SYSTEM

STATEMENT OF GOVERNMENT INTEREST

The invention described herein may be manufactured, used and licensed by or for the Government for governmental purposes without the payment to us of any royalty thereon.

BACKGROUND OF THE INVENTION

This invention relates generally to optical systems and particularly to objective lenses. While not limited thereto, the invention finds special application as an objective lens system in the periscope of a combat field vehicle and therefore will be described hereinafter in connection with such use.

In the design of a combat field vehicle periscope, for example, it was required that passive night sighting capability be provided by the design for the gunner and commander of the vehicle. This requirement necessitated the provision of an objective lens system which would match the spectral response (S20ER) and flat photocathode of a second generation image intensifier tube in order that the objective lens system and image intensifier tube might be incorporated into the night channel of the periscope. The present invention provides a refractive objective lens system which satisifies the above requirements.

SUMMARY OF THE INVENTION

An object of the invention is to provide an objective lens system which is exceedingly well corrected for the visible and near infrared spectral regions over a wide field of view.

Another object of the invention is to provide such a lens system which also affords passive night sighting capability.

A further object of the invention is the provision of an objective lens system in which the operative surfaces of all the lenses are spherical.

Still a further object of the invention is to provide an objective lens system in which the number of different radii of curvature and the number of surfaces requiring antireflection coatings are minimized.

Another object of the invention is the provision of such a lens system which can be manufactured with minimum cost.

A further object of the invention is to provide an objective lens system of improved performance.

In accordance with the above objects, and considered first in one of its broader aspects, an objective lens system according to the invention is corrected for the visible and near infrared spectral ranges over a field of view in excess of approximately 7°. The invention may comprise a doublet lens, a triplet lens, a biconcave lens, a biconvex lens, and a meniscus field flattener lens, arranged in the order named on the optical axis from object space toward the focal plane. The focal lengths of the doublet lens and triplet lens are greater than the focal length of the lens system and are positive. The focal length of the biconvex lens is less than the focal length of the lens system and is positive. The focal lengths of the biconcave lens and the meniscus field flattener lens are less than the focal length of the lens system and are negative.

The invention will be more clearly understood when the following detailed description of the preferred embodiments thereof is read in conjunction with the accompanying drawing which is described below.

BRIEF DESCRIPTION OF THE DRAWING

FIG. 2 is a diagrammatic view of part of a combat field vehicle elbow periscope containing another embodiment of the invention.

DESCRIPTION OF THE PREFERRED EMBODIMENTS

Figure 1:
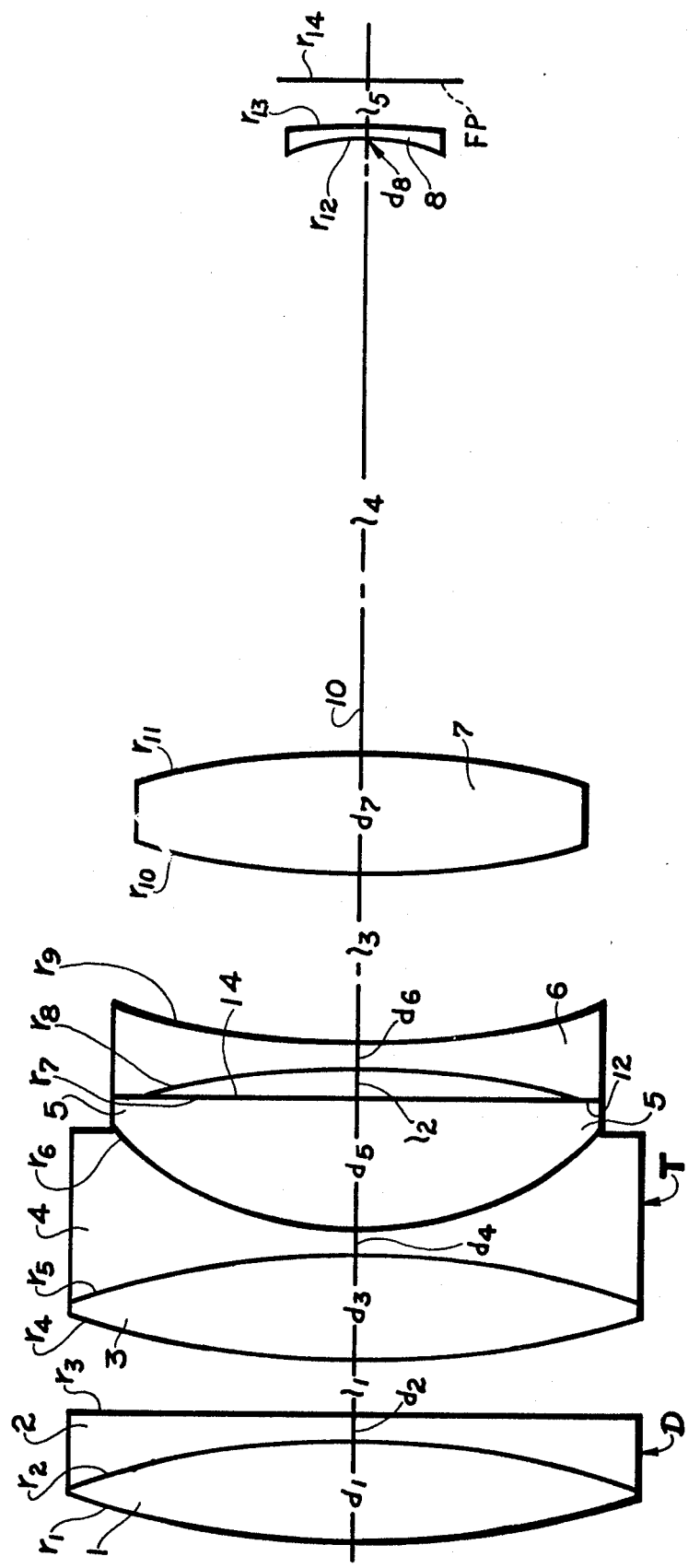
FIG. 1 is a diagrammatic view of an objective lens system representing one embodiment of the invention.

The objective lens system in FIG. 1 of the drawing comprises five lens members aligned on the optical axis 10 and consisting of a cemented doublet lens D, a cemented triplet lens T, and three singlet lenses 6, 7, and 8 arranged on the optical axis 10 in the order named from object space toward the focal plane FP, wherein object space is to the left of the doublet D, as viewed in FIG. 1.

The doublet lens D is composed of a biconvex lens 1 and a concave-plano lens 2 bonded to it with optical cement. The doublet lens D has a focal length of approximately 1.567F where F is the focal length of the lens system. The triplet lens T is spaced from the doublet lens D by an air space having an axial length $l_1$, and is composed of a biconvex lens 3, a double-concave lens 4, and a convex-plano lens 5, all bonded together with optical cement. The triplet lens T has a focal length of approximately 1.615F. Singlet lens 6 is equiconcave and has a focal length of approximately −0.764F. Lens 6 has an annular planar surface 12 which contacts the planar surface 14 of lens 5 and with lens 5 forms an air space having an axial length $l_2$.

Singlet lens 7 is a biconvex lens which is spaced from lens 6 by an air space having an axial length $l_3$. Lens 7 has a focal length of approximately 0.838F. The singlet lens 8 is a meniscus field flattener lens and has a focal length of approximately −0.852F. The meniscus lens 8 is spaced from lens 7 by an air space having an axial length $l_4$ and from the focal plane FP by an air space having an axial length $l_5$.

All operative lens surfaces $r_1$ to $r_{13}$ are spherical, and their reference characters $r_1$ to $r_{13}$ also designate the radii of curvature of these surfaces, as indicated in the exemplary table below. The axial thicknesses of the lenses 1 to 8 are represented by the reference characters $d_1$ to $d_8$ respectively.

An example of an objective lens system according to the invention has the lens data indicated in the table below in which:

$r$ = the radius of curvature
$d$ = the axial thickness of the lens
$l$ = the axial length of the air space
$n$ = the refractive index for Sodium D light
$V$ = Abbe's number of the glass
$F$ = focal length of the lens system
$f_1$ = focal length of lens D
$f_2$ = focal length of lens T
$f_3$ = focal length of lens 6
$f_4$ = focal length of lens 7
$f_5$ = focal length of lens 8
C.A.= clear aperture

| Lens No. & FP | Radius (in.) | Thickness (in.) | Air Space (in.) | n | V | C.A. (in.) |
|---|---|---|---|---|---|---|
| 1 | $r_1 = +7.353$ | $d_1 = .685$ | | 1.60729 | 56.7 | 3.96 |
|   | $r_2 = -7.353$ | | | | | 3.96 |
| 2 | | $d_2 = .204$ | | 1.61328 | 44.3 | 3.96 |
|   | $r_3 = \pm\infty$ | | | | | 3.96 |
|   | | | $l_1 = .379$ | | | |
| 3 | $r_4 = +7.353$ | $d_3 = .685$ | | 1.60729 | 56.7 | 3.90 |
|   | $r_5 = -7.353$ | | | | | 3.90 |
| 4 | | $d_4 = .204$ | | 1.61328 | 44.3 | 3.90 |
|   | $r_6 = +2.363$ | | | | | 3.52 |
| 5 | | $d_5 = .874$ | | 1.60729 | 56.7 | 3.52 |
|   | $r_7 = \pm\infty$ | | | | | 3.33 |
|   | | | $l_2 = .193$ | | | |
| 6 | $r_8 = -7.353$ | $d_6 = .204$ | | 1.61328 | 44.3 | 3.33 |
|   | $r_9 = +7.353$ | | | | | 3.33 |
|   | | | $l_3 = 1.169$ | | | |
| 7 | $r_{10} = +8.308$ | $d_7 = .730$ | | 1.60729 | 56.7 | 3.10 |
|   | $r_{11} = -7.353$ | | | | | 3.10 |
|   | | | $l_4 = 4.290$ | | | |
| 8 | $r_{12} = -1.560$ | $d_8 = .078$ | | 1.72000 | 29.3 | 1.10 |
|   | $r_{13} = -2.363$ | | | | | 1.10 |
|   | | | $l_5 = .295$ | | | |
| FP | $r_{14} = \pm\infty$ | | | | | 1.00 |

$F = 7.796$
$f_1 = 12.224$
$f_2 = 12.597$
$f_3 = -5.963$
$f_4 = 6.538$
$f_5 = -6.646$

In the above example, it is noted that seven radii of curvature have the same numerical value, two surfaces are planar, and of the remaining four lens surfaces two have numerically equal radii, all of which promotes ease and low cost of manufacture. The lens system is refractive, has a speed of F/2.0, and is exceedingly well corrected for the visible and near infrared spectral ranges of approximately from 0.45 to 1.0 micron over a field of view in excess of approximately 7°.

The embodiment illustrated in FIG. 2 is provided with optical path bending means between the biconvex singlet lens 7 and the meniscus field flattener lens 8 for bending the optical path 10' so as to adapt the objective lens system of FIG. 1 for use with an image intensifier tube 16 and an eyepiece 18 in an elbow periscope of a combat field vehicle. Preferably, the optical path folding means is a front surface mirror 20 positioned at 45° to the optical axis 10'. The focal plane, in this embodiment, coincides with the flat photocathode of the image intensifier tube 16.

The objective lens system matches the S20ER spectral reponse and flat photocathode of the image intensifier tube 16, so that the lens system and image intensifier tube 16 are readily incorporated into the night channel of the associated periscope.

Example of glass for manufacturing the various lens elements are as follows: All positive lens elements can be made from 607/567 (SK-2) glass; the negative elements, except the meniscus field flattener lens, can be made from 613/433 (K$_2$FSN4) glass; and the meniscus field flattener lens can be made from 720/293 glass.

We claim:

1. An objective lens system comprising a plurality of lens members, said lens members arranged on the optical axis in the order as named below and comprising a doublet lens having a focal length $f_1$, a triplet lens spaced from said doublet lens and having a focal length $f_2$, a biconcave lens having a focal length $f_3$ and abutting said triplet lens, a biconvex lens spaced from said biconcave lens and having a focal length $f_4$, and a meniscus field flattener lens spaced from said biconvex lens and having a focal length $f_5$, and wherein a majority of the operative surfaces of the totality of said lenses have numerically equal radii of curvature, the focal lengths have the following comparative values:

F = focal length of lens system
$f_1$ [>=] is greater than F and is positive,
$f_2$ [>=] is greater than F and is positive,
$f_3$ [<=] is less than F and is negative,
$f_4$ [<=] is less than F and is positive,
$f_5$ [<=] is less than F and is negative, and said objective lens system is corrected for the visible and near infrared spectral ranges over a field of view in excess of approximately 7°.

2. A lens system as defined in claim 1 wherein said doublet lens is composed of a biconvex lens and a concave-plano lens, said triplet lens is composed of a biconvex lens, a double-concave lens, and a convex-plano lens, and the focal lengths have the following values, in inches:

$F = 7.796$
$f_1 = 12.224$
$f_2 = 12.597$
$f_3 = -5.963$
$f_4 = 6.538$
$f_5 = -6.646$

3. A lens system according to claim 1 wherein the operative surfaces of all of said lenses are spherical.

4. A lens system according to claim 3 which is corrected for a spectral range of approximately 0.45 to 1.0 micron.

5. A refractive objective lens system having a focal plane FP and eight lens elements whose characteristics and relative spacing on the optical axis are substantially as shown by the data in the following table:

| Lens No. & FP | Radius, (in.) | Thickness, (in.) | Air Space, (in.) | n | V |
|---|---|---|---|---|---|
| 1 | $r_1 = +7.353$ | $d_1 = .685$ | | 1.60729 | 56.7 |
|   | $r_2 = -7.353$ | | | | |
| 2 | | $d_2 = .204$ | | 1.61328 | 44.3 |
|   | $r_3 = \pm\infty$ | | | | |
|   | | | $l_1 = .379$ | | |
| 3 | $r_4 = +7.353$ | $d_3 = .685$ | | 1.60729 | 56.7 |
|   | $r_5 = -7.353$ | | | | |
| 4 | | $d_4 = .204$ | | 1.61328 | 44.3 |
|   | $r_6 = +2.363$ | | | | |
| 5 | | $d_5 = .874$ | | 1.60729 | 56.7 |
|   | $r_7 = +\infty$ | | | | |
|   | | | $l_2 = .193$ | | |
| 6 | $r_8 = -7.353$ | $d_6 = .204$ | | 1.61328 | 44.3 |
|   | $r_9 = +7.353$ | | | | |
|   | | | $l_3 = 1.169$ | | |
| 7 | $r_{10} = +8.308$ | $d_7 = .730$ | | 1.60729 | 56.7 |
|   | $r_{11} = -7.353$ | | | | |
|   | | | $l_4 = 4.290$ | | |
| 8 | $r_{12} = -1.560$ | $d_8 = .078$ | | 1.72000 | 29.3 |

-Continued

| Lens No. & FP | Radius, (in.) | Thickness, (in.) | Air Space, (in.) | n | V |
|---|---|---|---|---|---|
| | $r_{13}=-2.363$ | | | | |
| FP | $r_{14}=\pm\infty$ | | $l_5=.295$ | | |

Wherein the lens elements are numbered in order from object space toward the focal plane FP, the radius of curvature of each operative lens surface and of the focal plane is indicated by r with a numerical subscript identifying the particular surface or focal plane, the thickness of each lens element and the axial length of the air space between certain lens elements including the focal plane are indicated respectively by $d$ and $l$ each with a numerical subscript identifying the particular lens or air space, $n$ is the refractive index for sodium D light, and V is Abbe's number of the glass used for the designated lens.

6. A lens system as defined in claim 4 characterized further by the provision of means between said biconvex lens and said meniscus field flattener lens for folding the optical path.

7. A lens system according to claim 4 which is corrected for the S20ER response and the flat photocathode of an image intensifier tube.

* * * * *